United States Patent
Yamaji (10) Patent No.: US 11,436,778 B2
(45) Date of Patent: *Sep. 6, 2022

(54) IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,718

(22) Filed: Jan. 6, 2022

(65) Prior Publication Data

US 2022/0130090 A1 Apr. 28, 2022

Related U.S. Application Data

(63) Continuation of application No. 16/895,026, filed on Jun. 8, 2020, now Pat. No. 11,250,605, which is a (Continued)

(30) Foreign Application Priority Data

Dec. 28, 2017 (JP) .............................. JP2017-254040

(51) Int. Cl.
*G06T 11/60* (2006.01)
*G06V 40/10* (2022.01)

(52) U.S. Cl.
CPC .............. *G06T 11/60* (2013.01); *G06V 40/10* (2022.01)

(58) Field of Classification Search
CPC ................. G06F 3/0482; G06F 16/583; G06F 3/03548; G06F 16/2452; G06F 16/258;
(Continued)

(56) References Cited

U.S. PATENT DOCUMENTS

2013/0094721 A1* 4/2013 Kawasaki ............... G06F 16/58
382/118
2013/0145260 A1 6/2013 Munekuni
(Continued)

FOREIGN PATENT DOCUMENTS

JP 2009223764 A 10/2009
JP 2010057073 A 3/2010
(Continued)

OTHER PUBLICATIONS

International Search Report issued in PCT/JP2018/040976; dated Jan. 22, 2019.
(Continued)

*Primary Examiner* — Rayeez R Chowdhury
(74) *Attorney, Agent, or Firm* — Studebaker & Brackett PC (57) ABSTRACT

In an image processing device, an image processing method and a recording medium, individual images and common images are selected from a plurality of images based an analysis result of images, a specific individual, and association of a person with a group of an image of the person. The individual images are laid out on an individual page, and the common images are laid out on a common page. Images in which two or less persons including a person corresponding to the specific individual appear are preferentially selected as the individual image, and images which are other than the individual images and in which three or more persons appear are selected as the common images such that the number of appearances of each person becomes an average of the numbers of appearances of a plurality of persons.

21 Claims, 6 Drawing Sheets

Related U.S. Application Data continuation of application No. PCT/JP2018/040976, filed on Nov. 5, 2018.

(58) Field of Classification Search
CPC .............. G06F 16/638; G06F 3/04842; G06F 40/274; G06F 40/56; G06F 3/0483; G06F 3/04845; G06F 16/532; G06F 16/55; G06F 21/6245; G06F 21/629; G06F 21/84; G06F 3/14; G06F 3/147; G06F 16/248; G06F 16/245; G06F 16/5838; G06F 3/011; G06F 30/00; G06F 1/163; G06F 3/016; G06F 3/017; G06F 16/29; G06F 16/5866; G06F 16/23; G06F 16/252; G06F 16/285; G06F 16/51; G06F 16/5846; G06F 16/9537; G06F 17/18; G06F 2203/04804; G06F 3/03547; G06F 3/042; G06F 3/0481; G06F 3/04847
See application file for complete search history.

(56) References Cited

U.S. PATENT DOCUMENTS

| | | | |
|---|---|---|---|
| 2015/0355799 A1* | 12/2015 | Yamagishi | G06F 3/04817 715/730 |
| 2019/0146991 A1* | 5/2019 | Sato | G06V 20/52 382/224 |

FOREIGN PATENT DOCUMENTS

| | | |
|---|---|---|
| JP | 2013088921 A | 5/2013 |
| JP | 6071189 B2 | 2/2017 |
| JP | 2017-054523 A | 3/2017 |

OTHER PUBLICATIONS

International Preliminary Report on Patentability and Written Opinion issued in PCT/JP2018/040976; dated Jun. 30, 2020.

* cited by examiner

INDIVIDUAL PAGE OF EACH PRESCHOOLER

COMMON PAGE OF ALL PRESCHOOLERS

IMAGE PROCESSING DEVICE, IMAGE PROCESSING METHOD, PROGRAM, AND RECORDING MEDIUM

CROSS-REFERENCE TO RELATED APPLICATIONS

This application is a Continuation of application Ser. No. 16/895,026 filed Jun. 8, 2020, which is Continuation of PCT International Application No. PCT/JP2018/040976 filed on Nov. 5, 2018, which claims priority under 35 U.S.C § 119(a) to Japanese Patent Application No. 2017-254040 filed on Dec. 28, 2017. Each of the above application(s) is hereby expressly incorporated by reference, in its entirety, into the present application.

BACKGROUND OF THE INVENTION

1. Field of the Invention

The present invention relates to an image processing device, an image processing method, a program, and a recording medium which create a photo album by using a plurality of images in which a plurality of persons appears.

2. Description of the Related Art

For example, photo albums having the same contents for all preschoolers are created as yearbooks of kindergartens and preschools. That is, the yearbook includes a plurality of common pages used in common by all the preschoolers.

In a case where the yearbook is created, a plurality of images (photos) is generally classified on monthly basis, and is arranged on each page. A group image (group photo) in which many preschoolers appear is used with no feeling of unfairness. Since the group image is used, each preschooler appears so as to be small in each image. Accordingly, parents who view the yearbook are hard to know where their child is in the yearbook, and there is a need for a yearbook created such that the number of appearances of their child on the images of the yearbook is equal to the number of appearances of another child.

Here, the related arts related to the present invention include JP6071189B and JP2010-057073A.

SUMMARY OF THE INVENTION

An object of the present invention is to provide an image processing device, an image processing method, a program, and a recording medium capable of creating an individual page used only by a specific individual of a plurality of persons and further equalizing the numbers of appearances of the persons on images included in a common page used in common by the plurality of persons in a case where a photo album is created by using a plurality of images in which the plurality of persons appears.

In order to achieve the aforementioned object, the present invention provides an image processing device comprises a processor. The processor is configured to obtain a command of a user, register names of a plurality of persons, obtain a plurality of images in which the plurality of persons appears, analyze the plurality of images, associate the names of each of the plurality of persons with the images in which each of the plurality of persons appears based on an analysis result of the plurality of images, designate a name of a specific person among the names of the plurality of persons according to a command of the user, select individual images used on one or more individual pages included in a photo album and common images used on one or more common pages included in the photo album from the plurality of images based on the name of the specific person, count number of appearances of each of the plurality of persons on the common images, lay the individual images out on the individual page and lay the common images out on the common page based on layout information, and preferentially select, as the individual images, images in which two or less persons including the specific person appear, and select, as the common images, images which are other than the individual images and in which three or more persons appear such that the number of appearances of each of the plurality of persons becomes an average of numbers of appearances of the plurality of persons.

It is preferable that the processor is further configured to display, as a display individual page, the individual page which is laid out, on a display, to edit a layout of the display individual page according to a command of the user, and display, as a display common page, the common page which is laid out, on the display, to edit a layout of the display common page according to a command of the user.

It is preferable that the processor is further configured to display a list of the names of the plurality of persons on the display, and designate, as the name of the specific person, a name of one person selected according to a command of the user from the list of the names of the plurality of persons.

It is preferable that the processor is further configured to select images in which the specific person appears from the plurality of images, and preferentially display, as editing candidate images for editing the display individual page, the selected images on the display.

It is preferable that the processor is further configured to display the numbers of appearances of each of the plurality of persons on at least one of the entire photo album or each of the one or more common pages on the display.

It is preferable that the processor is further configured to display a list of the names of the plurality of persons on the display, and identifiably display names of persons corresponding to persons appearing in the individual image or the common image selected according to a command of the user in the list.

It is preferable that the processor is further configured to display a list of names of persons corresponding to persons appearing in the individual image or the common image selected according to a command of the user on the display.

It is preferable that the processor is further configured to calculate a score by evaluating each image based on the analysis result of the plurality of images, and in a case where a number of appearances of the specific person in the common image is larger than the average of the numbers of appearances of the plurality of persons, select the common images of which the scores are smaller than a threshold value from the common images in which the specific person appears, display the selected common images as deletion candidate images on the display, and delete the deletion candidate image selected according to a command of the user from the deletion candidate images displayed on the display from the display common page.

It is preferable that, in a case where a number of appearances of the specific person in the common image is larger than the average of the numbers of appearances of the plurality of persons, and number of appearances of another person becomes smaller than the average of the numbers of appearances of the plurality of person by deleting one common image from the common images in which the specific person appears, the processor is further configured to select the common images in which another person does not appear from the common images in which the specific person appears, display the selected common images as deletion candidate images on the display, and delete a deletion candidate image selected according to a command of the user from the deletion candidate images displayed on the display from the display common page.

It is preferable that the processor is further configured to calculate a score by evaluating each image based on the analysis result of the plurality of images, and in a case where a number of appearances of the specific person in the common image is smaller than the average of the numbers of appearances of the plurality of persons, select the common images of which the scores are equal to or greater than a threshold value from the common images in which the specific person appears, display the selected common images as adoption candidate images on the display, and lay an adoption candidate image selected according to a command of the user from the adoption candidate images displayed on the display out on the display common page.

It is preferable that, in a case where a number of appearances of the specific person in the common image is smaller than the average of the numbers of appearances of the plurality of persons, and number of appearances of another person becomes larger than the average of the numbers of appearances of the plurality of persons by adding one common image from the common images in which the specific person appears, the processor is further configured to select the common images in which a person other than another person appears from the common images in which the specific person appears, display the selected common images as adoption candidate images on the display, and lay an adoption candidate image selected according to a command of the user from the adoption candidate images displayed on the display out on the display common page.

It is preferable that, in a case where a number of appearances of the specific person in the common image is larger than the average of the numbers of appearances of the plurality of persons, the processor is further configured to delete the specific person from the common images in which the specific person appears by trimming the common images in which the specific person appears.

It is preferable that the processor is further configured to detect a size of a face of a person appearing in the common image, count, as a main appearance number, the number of appearances of each of the plurality of persons of which the size of the face is equal to or greater than a threshold value on the common image, and use the main appearance number of the specific person instead of a number of appearances of the specific person, and use an average of the main appearance numbers of the plurality of persons instead of the average of the numbers of appearances of the plurality of persons.

It is preferable that the processor is further configured to calculate degrees of intimacy of the specific person and each person other than the specific person based on the analysis result of the plurality of images, select images for editing the display individual page from the plurality of images, display the selected images as editing candidate images on the display, and preferentially display the editing candidate image in which a person of which the degree of intimacy with the specific person is equal to or greater than a threshold value appears among the editing candidate images.

It is preferable that the processor is further configured to calculate degrees of intimacy of the specific person and each person other than the specific person based on the analysis result of the plurality of images, preferentially select, as the individual images, images in which a person of which the degree of intimacy with the specific person is equal to or greater than a threshold value appears from the plurality of images.

It is preferable that the processor is further configured to store trimming information of an image ordered to be printed after trimming is performed among the plurality of images, and in a case where the individual image laid out on a display individual page is an image ordered to be printed after the trimming is performed in the past, perform the same trimming as the trimming of the image ordered to be printed on the individual image based on the trimming information.

It is preferable that the processor is further configured to store information on an order quantity of an image ordered to be printed among the plurality of images, and select images for editing the display common page from the plurality of images, display the selected images as editing candidate images on the display, and identifiably display the editing candidate image of which the order quantity of the image ordered to be printed in the past is equal to or greater than a threshold value among the editing candidate images displayed on the display.

It is preferable that the processor is further configured to store information on an order quantity of an image ordered to be printed among the plurality of images, and preferentially select, as the common images, images of which the order quantity of the image ordered to be printed in the past is equal to or greater than a threshold value from the plurality of images.

It is preferable that the processor is further configured to lay the common images out on the common page such that a number of persons appearing in the common image laid out in a region having a large size is larger than a number of persons appearing in the common image laid out in a region having a small size.

The present invention provides an image processing method comprises a step of obtaining a command of a user, a step of registering names of a plurality of persons, a step of obtaining a plurality of images in which the plurality of persons appears, a step of analyzing the plurality of images, a step of associating the names of each of the plurality of persons with the images in which each of the plurality of persons appears based on an analysis result of the plurality of images, a step of designating a name of a specific person among the names of the plurality of persons according to a command of the user, a step of selecting individual images used on one or more individual pages included in a photo album and common images used on one or more common pages included in the photo album from the plurality of images based on the name of the specific person, a step of counting number of appearances of each plurality of persons on the common images, and a step of laying the individual images out on the individual page and laying the common images out on the common page based on layout information. In the step of selecting the individual images and the common images, images in which two or less persons including the specific person appear are preferentially selected as the individual images, and images which are other than the individual images and in which three or more persons appear are selected as the common images such that the number of appearances of each of the plurality of persons becomes an average of numbers of appearances of the plurality of persons.

The present invention provides a computer-readable recording medium having recorded thereon a program causing a computer to execute the steps of the image processing method recorded thereon.

According to the present invention, since it is possible to create the photo album including the individual pages, it is possible to create the photo album customized according to the specific individual of the plurality of persons, that is, each person. Since it is possible to equalize the number of appearances of each person on the common images included in the common page, it is possible to remove a feeling of unfairness among the plurality of persons.

DESCRIPTION OF THE PREFERRED EMBODIMENTS

Hereinafter, an image processing device, an image processing method, a program, and a recording medium according to an embodiment of the present invention will be described in detail based on preferred embodiments shown in the accompanying drawings.

Figure 1:
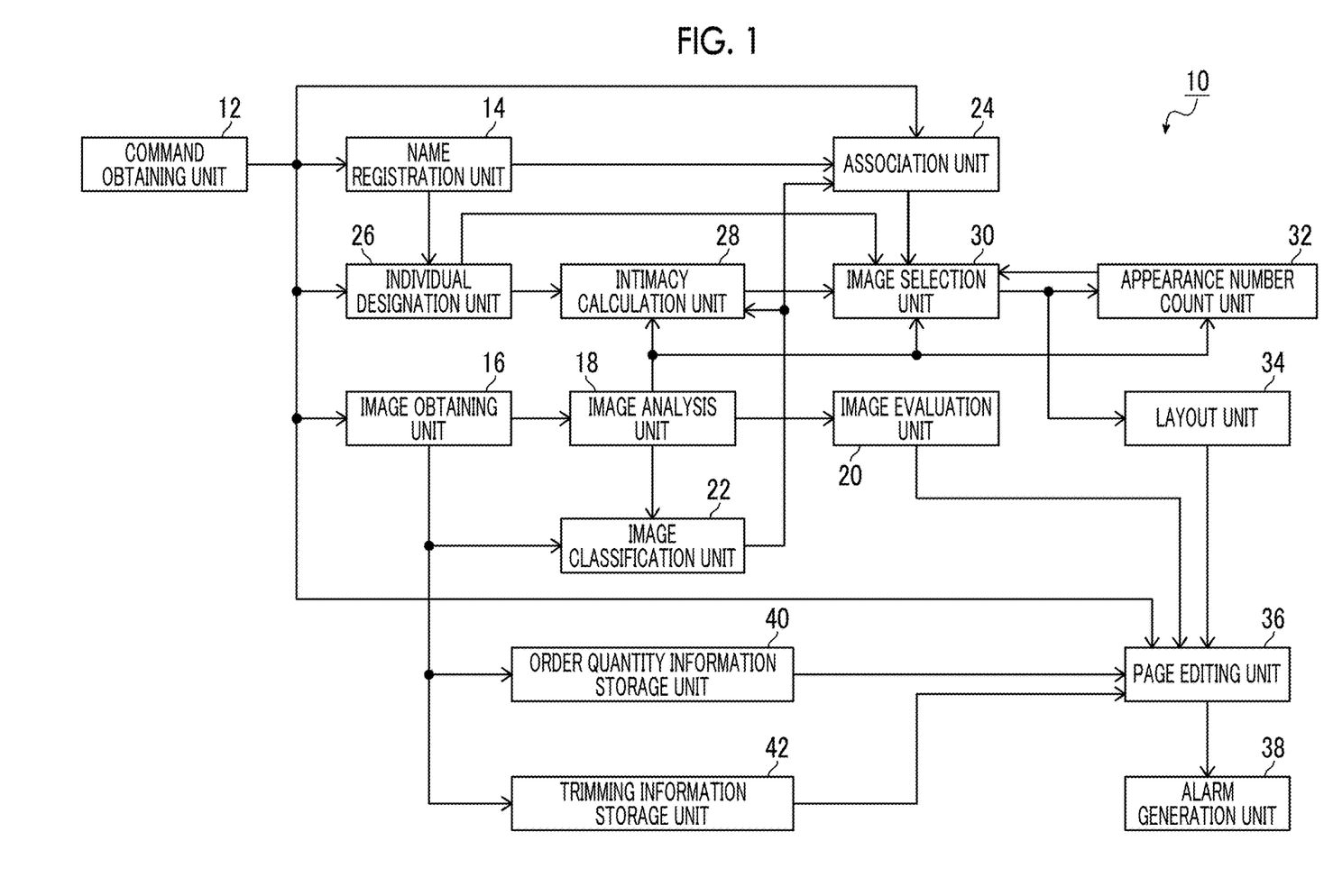
FIG. 1 is a block diagram of an embodiment showing a configuration of an image processing device according to an embodiment of the present invention.

FIG. 1 is a block diagram of an embodiment showing a configuration of an image processing device according to the embodiment of the present invention. An image processing device 10 shown in FIG. 1 creates a photo album (photo book) by using a plurality of images in which a plurality of persons appears. More specifically, the photo album including one or more individual pages used only by a specific individual and one or more common pages commonly used by the plurality of persons including the specific individual is created.

For example, in the case of a kindergarten and a preschool, the plurality of persons is a plurality of preschoolers, and the specific individual is one preschooler designated among the plurality of preschoolers. That is, the specific individual is each preschooler designated among the plurality of preschoolers. The image processing device 10 creates, as the photo album, a yearbook customized for each preschooler including an individual page of the specific individual and common pages common to the plurality of preschoolers.

As shown in FIG. 1, the image processing device 10 comprises a command obtaining unit 12, a name registration unit 14, an image obtaining unit 16, an image analysis unit 18, an image evaluation unit 20, an image classification unit 22, an association unit 24, an individual designation unit 26, an intimacy calculation unit 28, an image selection unit 30, an appearance number count unit 32, a layout unit 34, a page editing unit 36, an alarm generation unit 38, an order quantity information storage unit 40, and a trimming information storage unit 42.

In the image processing device 10, the command obtaining unit 12 obtains various commands input from a user.

Subsequently, the name registration unit 14 registers names of the plurality of persons according to a command of the user obtained by the command obtaining unit 12, for example. The name registration unit 14 may register the names of the plurality of persons based on information of a list of the names of the plurality of persons.

Subsequently, the image obtaining unit 16 obtains a plurality of images in which the plurality of persons appears according to a command of the user and which is used for the photo album, for example. The image obtaining unit 16 may obtain a plurality of image stored in a storage location set in advance.

Subsequently, the image analysis unit 18 analyzes the plurality of images obtained by the image obtaining unit 16.

An analysis item of the image is not particularly limited, and includes analysis of an image content such as subject detection (person detection and object detection) for detecting a subject appearing in the image, face detection and face recognition of the person, face size detection for detecting a size of a face of the person, and distance detection for detecting a distance between the persons appearing in the image, analysis of quality of the image such as brightness, hue, contrast, and a degree of blurriness of the image, and analysis of time information (imaging date and time) and positional information (imaging location) included in additional information of the image such as exchangeable image file format (Exif).

Subsequently, the image evaluation unit 20 evaluates the images based on the analysis result of the plurality of images using the image analysis unit 18, and calculates scores.

The method of calculating the scores of the images is not particularly limited, and for example, a score of each analysis item and a total score of all the analysis items using the image analysis unit 18 may be calculated for each image. The method of calculating the score of each analysis item is also not particularly limited. For example, a score in a case where the size of the face of the person appearing in the image may be set to be larger is higher than in a case where the size of the face of the person is smaller, or a score in a case where the degree of blurriness of the image is lower may be set to be larger than in a case where degree of blurriness of the image is higher. The same is true of other analysis items.

Subsequently, the image classification unit 22 classifies the plurality of images into a plurality of groups including the images in which each of the plurality of persons appears based on the analysis result of the plurality of images, for example, the analysis result of the face detection and face recognition.

Subsequently, the association unit 24 associates the name of each person registered in the name registration unit 14 with each of the plurality of groups including the image in which the person corresponding to the name of each person appears which is classified by the image classification unit 22 according to a command of the user. The association unit 24 may perform the association based on information of association of the name of each person with the group of each image.

Subsequently, the individual designation unit 26 designates the name of the specific individual among the names of the plurality of persons registered in the name registration unit 14 according to a command of the user.

Subsequently, the intimacy calculation unit 28 calculates a degree of intimacy between the specific individual and each person other than the specific individual based on the analysis result of the plurality of images, the name of the specific individual designated by the individual designation unit 26, and the association of the name of each person with the group of each image performed by the association unit 24.

The method of calculating the degree of intimacy is not particularly limited. For example, since a person who appears with the specific individual in many images, a person who appears with less persons in the image in which this person appears with the specific individual, and a person within a short distance with the specific individual in the image in which this person appears with the specific individual are regarded as persons having a high degree of intimacy with the specific individual, it is possible to set a degree of intimacy between each person and the specific individual to be higher than a degree of intimacy between another person and the specific individual.

Subsequently, the image selection unit 30 selects individual images used in the individual pages and common images used in the common pages from the plurality of images based on at least one of the analysis result of the plurality of images, the name of the specific individual designated by the individual designation unit 26, the association of the name of each person with each group, or the degree of intimacy between the specific individual and each person other than the specific individual calculated by the intimacy calculation unit 28.

Subsequently, the appearance number count unit 32 counts the number of appearances of each person on the common image selected by the image selection unit 30 based on the analysis result of the plurality of images using the image analysis unit 18, that is, the analysis result of the person detection.

Subsequently, the layout unit 34 lays the individual images selected by the image selection unit 30 outs on the individual pages, and lays the common images out on the common pages based on layout information for designating layouts of the photo album. The layout unit 34 creates the photo album including a front page, individual pages, common pages, special pages, and a rear page.

Subsequently, the page editing unit 36 displays, a display individual page, the individual page laid out on an image display unit such as a liquid crystal display by the layout unit 34, and edits a layout of the display individual page according to a command of the user. The page editing unit 36 displays, as display common page, the common page laid out on the image display unit by the layout unit 34, and edits a layout of the display common page according to a command of the user.

Subsequently, the alarm generation unit 38 generates an alarm for confirming whether or not to delete the deletion candidate images before the deletion candidate images to be described below are deleted from the display common page by the page editing unit 36.

In a case where the number of appearances of the specific person on the common images is greater than an average of the numbers of appearances of the plurality of persons on the display common pages, the deletion candidate images are candidate images as targets to be deleted among the common images in which the specific person appears.

Subsequently, the order quantity information storage unit 40 stores information of an order quantity of the image ordered to be printed among the plurality of images.

Subsequently, the trimming information storage unit 42 stores trimming information of the image ordered to be printed among the plurality of images after the image is trimmed.

Figure 2:
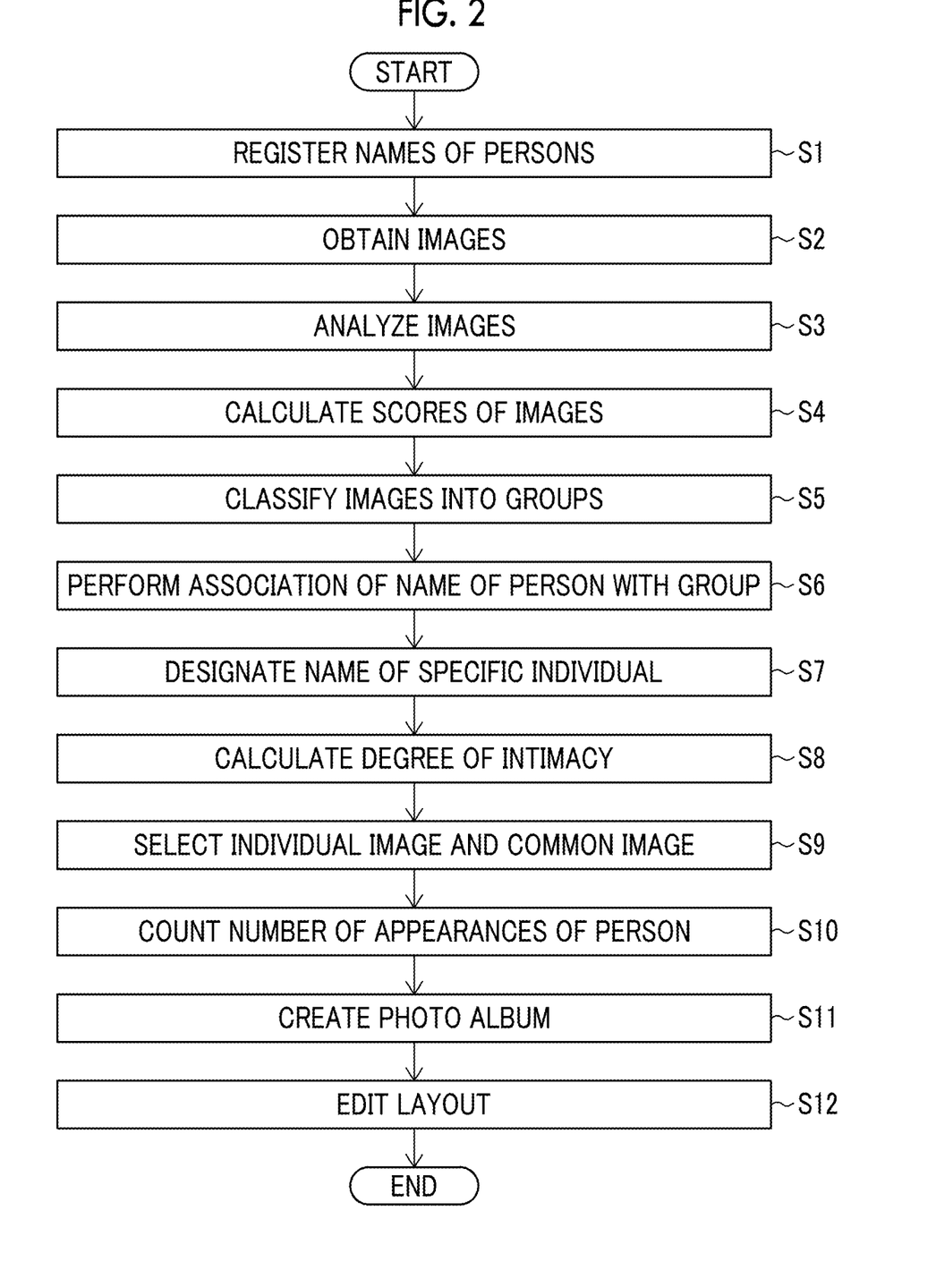
FIG. 2 is a flowchart showing an operation of the image processing device.

Next, an operation of the image processing device 10 will be described with reference to a flowchart shown in FIG. 2.

In the following description, an example in which the yearbook of the kindergarten and the preschool is created as the photo album will be described.

Figure 3:
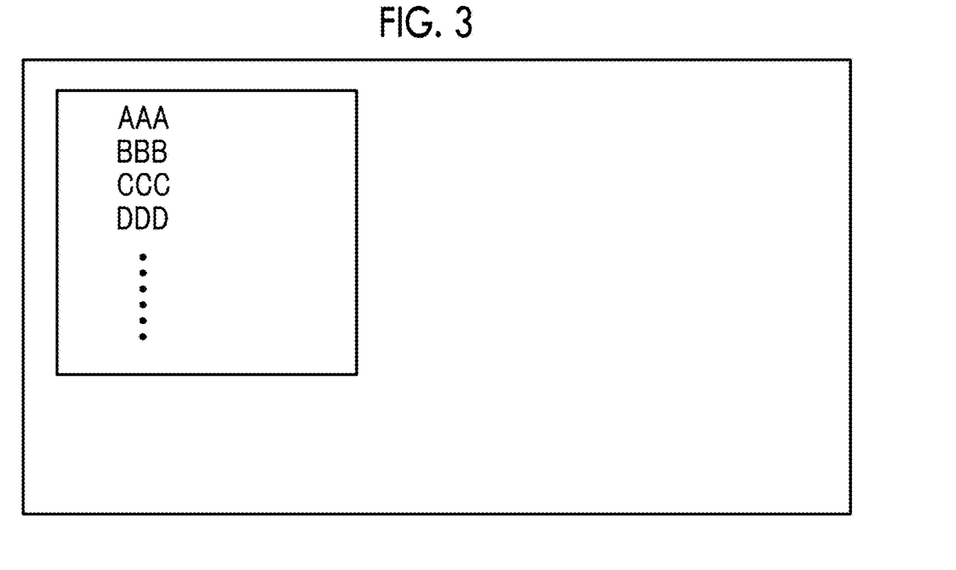
FIG. 3 is a conceptual diagram showing an input screen for designating names of a plurality of persons.

In a case where the photo album is created, the user of the image processing device 10 initially inputs a command for designating the names of the plurality of persons through, for example, the command obtaining unit 12, as shown in FIG. 3.

In the case of the kindergarten and the preschool, the user of the image processing device 10 is, for example, a teacher.

In FIG. 3, on an input screen of a name of the preschooler, names of the plurality of preschoolers, for example, names of AAA, BBB, CCC, . . . are input by the teacher.

In a case where the command for designating the names of the plurality of persons is input, the names of the plurality of persons input according to the command of the user are registered by the name registration unit 14 (step S1).

Subsequently, the user inputs the command for designating the plurality of images through, for example, the command obtaining unit 12.

In a case where the plurality of images is designated, the plurality of images designated according to the command of the user is obtained by the image obtaining unit 16 (step S2).

The image obtaining unit 16 can obtain, but not particularly limited to, various images such as images captured by teachers and photographers in an event of the kindergarten and the preschool and images captured by parents of the preschooler at home of each preschooler.

In a case where the plurality of images is obtained, the plurality of image is analyzed by the image analysis unit 18 (step S3).

Subsequently, the images are evaluated based on the analysis result of the plurality of images, and the scores are calculated by the image evaluation unit 20 (step S4).

Figure 4:
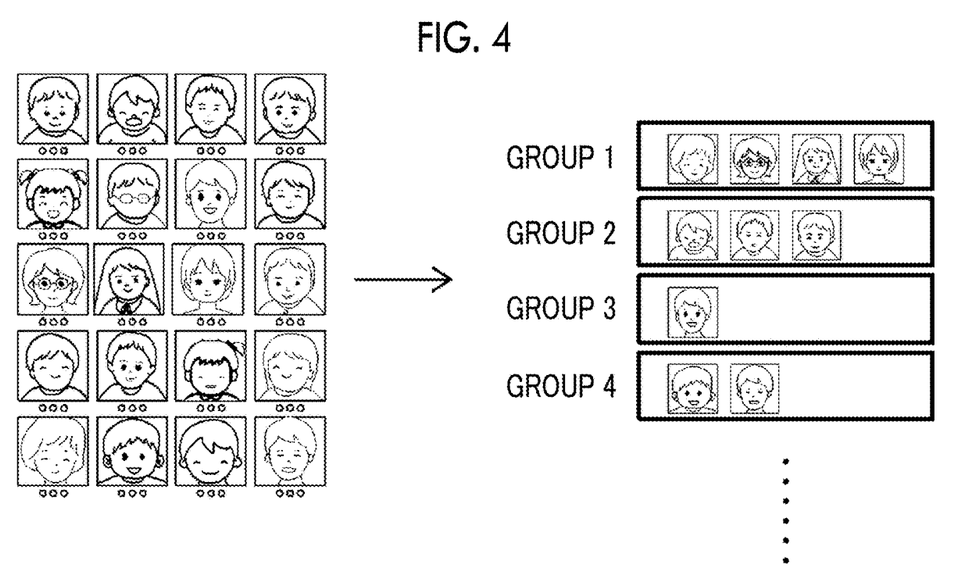
FIG. 4 is a conceptual diagram showing a state in which a plurality of images is classified into a plurality of groups including images in which each person appears.

As shown in FIG. 4, the plurality of images is classified into the plurality of groups including the images in which each of the plurality of persons appears based on the analysis result of the plurality of images by the image classification unit 22 (step S5).

In FIG. 4, the plurality of images (left side of FIG. 4) in which the preschoolers appear is classified into group 1, group 2, group 3, . . . (right side of FIG. 4) including the images in which the preschoolers appear.

Figure 5:
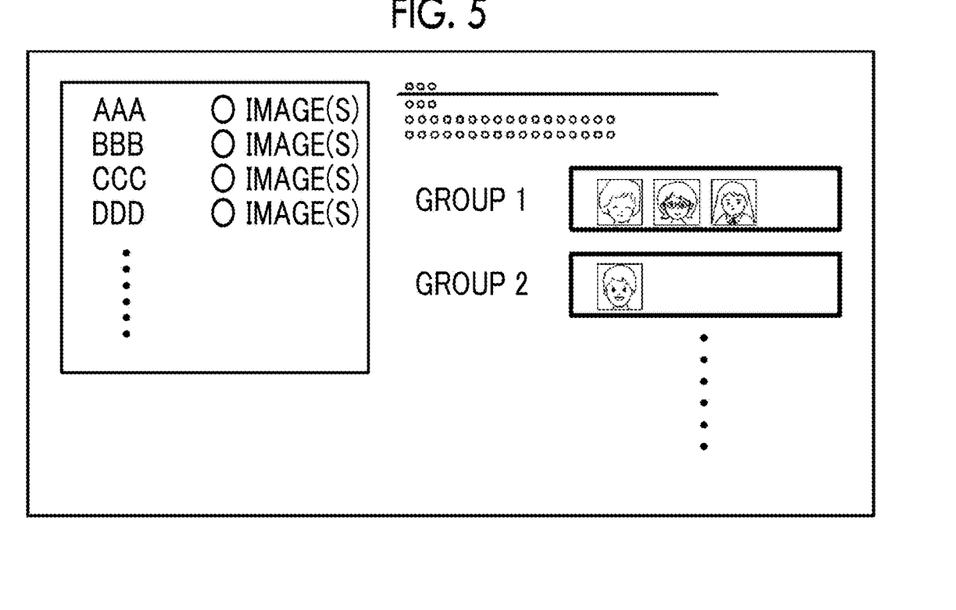
FIG. 5 is a conceptual diagram showing a list of the names of the plurality of persons, the number of images of each person, and the number of images of each group classified for each person.

In a case where the images are classified into the groups for each person, the list of the names of the plurality of persons registered in the name registration unit 14, the number of images of each person, and the images of each group classified for each person are displayed on the image display unit, as shown in FIG. 5.

In FIG. 5, the list of the plurality of preschoolers (left side of FIG. 5), the number of images of each preschooler (center of FIG. 5), and groups 1, 2, 3, . . . (right side of FIG. 5) of the images in which the preschoolers appear are displayed.

Subsequently, the user inputs a command for designating the association of the name of each person displayed on the image display unit with each group including the image in which the person corresponding to the name of each person appears through, for example, the command obtaining unit 12.

In a case where the command of the association of the name of the person with the group of the image is input, the association of the name of each person with each group including the image in which the person corresponding to the name of each person appears is performed by the association unit 24 according to a command of the user (step S6).

The association of the name of the person with the group of the image may be performed on monthly basis, or may be performed before the photo album is created. In a case where the association of the name of the person with the group of the image is performed once, the persons appearing in each image are detected from each of the subsequently captured images by the image analysis unit 18, and each image is automatically classified into the group including the images in which each person appears by the image classification unit 22 based on the analysis result of the plurality of images.

Subsequently, the user inputs information for designating, as the name of the specific individual, the name of one person among the names of the plurality of persons registered in the name registration unit 14 through the command obtaining unit 12.

In a case where the name of the specific individual is input, the name of the specific individual is designated among the names of the plurality of persons registered in the name registration unit 14 by the individual designation unit 26 according to a command of the user (step S7).

The method of designating the name of the specific individual is not particularly limited. For example, the user can select the name of one person among the list of the name of the plurality of persons displayed on the image display unit, and can designate, as the name of the specific individual, the selected name. In this case, the individual designation unit 26 designates, as the name of the specific individual, the name of one person selected according to a command of the user from the list of the names of the plurality of persons displayed on the image display unit.

Subsequently, the degree of intimacy between the specific individual and each person other than the specific individual is calculated based on the analysis result of the plurality of images, the name of the specific individual, and the association of the name of each person and the group of each image by the intimacy calculation unit 28 (step S8).

Subsequently, the individual images and the common image are selected from the plurality of images by the image selection unit 30 based on the analysis result of the plurality of images, the name of the specific individual, the association, and the degrees of intimacy (step S9).

The image selection unit 30 preferentially selects images in which two or less persons including the person corresponding to the name of the specific individual appear in order to select, as the individual images, the images in which the specific individual appears. Images which are other than the individual images and in which three or more persons appear are selected as the common images. An upper limit of the number of persons appearing in the common images is not limited. It is desirable that the common images are images in which the specific person of the plurality of persons is not remarkable.

Subsequently, the number of appearances of each person on the common images is counted based on the analysis result of the plurality of images by the appearance number count unit 32 (step S10).

In a case where the number of appearances of each person is counted, the images which are other than the individual images and in which three or more persons appear are selected from the plurality of images such that the number of appearances of each person becomes the average of the numbers of appearances of the plurality of persons by the image selection unit 30 in order to select, as the common images, the images without feeling unfairness among the plurality of persons. Accordingly, it is possible to equalize the number of appearances of each person on the common images for the plurality of persons.

Subsequently, the user inputs the layout information through the command obtaining unit 12.

TABLE 1

| No. | Item | Details |
|---|---|---|
| 1 | Size | A4, A5, . . . |
| 2 | Number of pages | 10P, 15P, 20P, . . . |
| 3 | Number of images of each page | smaller, normal, larger |
| 4 | Special page presence or absence of individual page and page position | presence, 3-4 pages |
| 5 | Special page: presence or absence of preschooler list page and page position | presence, 1-2 pages |
| 6 | Special page presence or absence of teacher list page and page position | . . . |
| 7 | Others: case where there is special page | . . . |
| 8 | Period of image | 1 year, 2 years, 3 years |
| 9 | . . . | |

As represented in Table 1, the layout information includes, but not particularly limited to, a size of a page of the photo album, the number of pages, the number of images for each page, the presence or absence of a special page and a page position thereof, and information of an imaging period of the image. The special page includes a preschooler list page on which face images of the preschoolers are displayed as a list, a teacher list page on which face images of the teachers are displayed as a list, and other special pages in addition to the individual pages.

The size of the page of the photo album is information indicating the size of the page of the photo album such as A4, A5, . . . , and the like. The number of pages is information indicating the number of pages of the entire photo album such as 10P (pages), 15P, 20P, . . . , and the like. The number of images per page is information indicating the number of images laid out on each page such as a small number, a normal number, and a large number. The presence and absence of the individual page and the page position thereof are information indicating whether or not the individual page is included in the photo album such as "presence, 3 to 4 pages", and information indicating the page position of the individual page in a case where the individual page is included in the photo album. The presence and absence of the preschooler list page and the page position thereof are information indicating whether or not the preschooler list page is included in the photo album such as "presence, pages 1 to 2", and information indicating the page position of the preschooler list page in a case where the preschooler list page is included in the photo album. The imaging period of the image is information indicating a period during which the image included in the photo album is captured such as one year, two years, three years, . . . , and the like.

Figure 6:
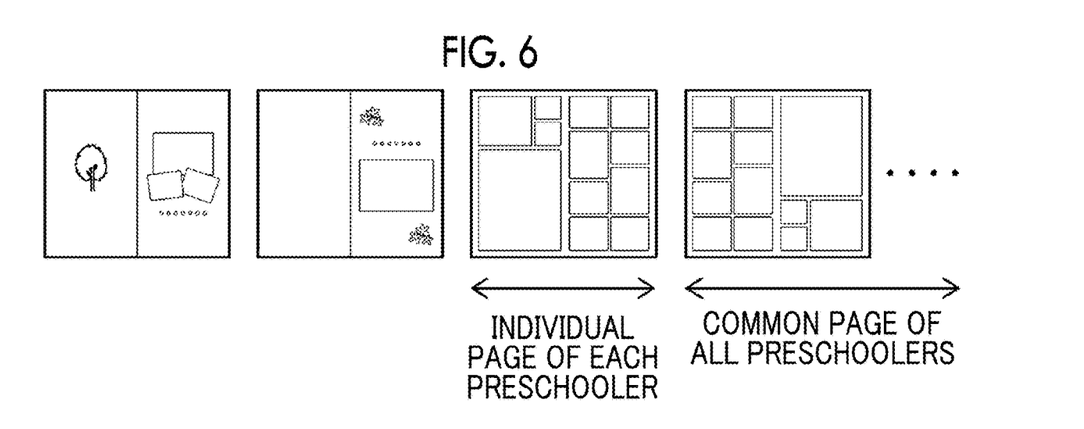
FIG. 6 is a conceptual diagram showing each page of the photo album.

In a case where the layout information is input, the individual images are laid out on the individual pages, and the common images are laid out on the common pages based on the layout information by the layout unit 34. As shown in FIG. 6, for example, the photo album including the front page, the individual pages of each preschooler, the common pages of all the preschoolers, the special pages, and the rear page is created as the yearbook (step S11).

The user can display each page of the photo album on the image display unit, and can edit the displayed page according to a command of the user. For example, in a case where the individual page is edited, the user inputs a command for designating the individual page to be edited.

Figure 7:
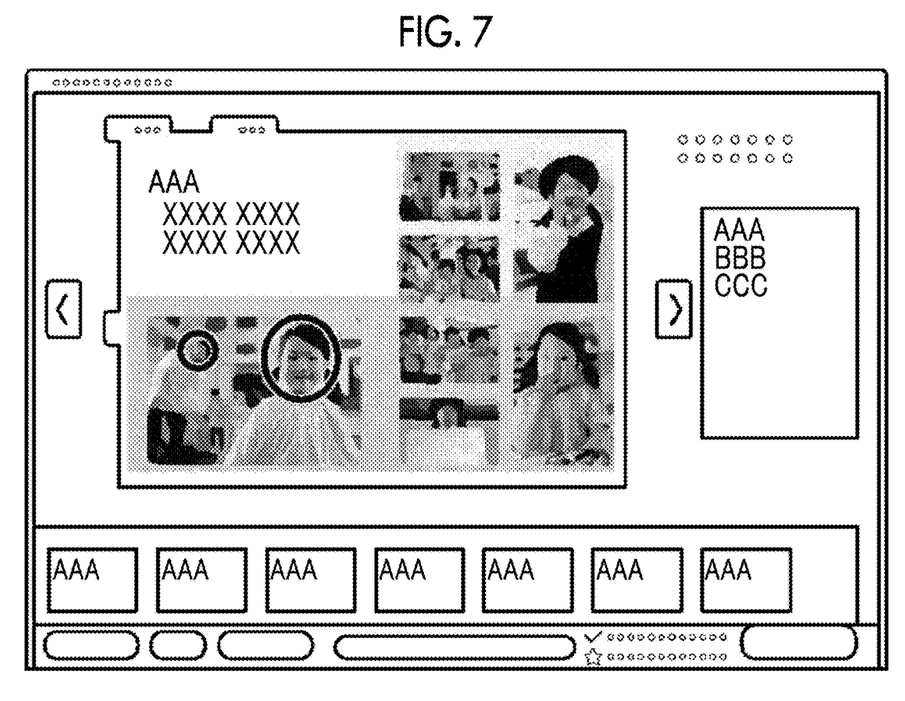
FIG. 7 is a conceptual diagram showing an editing screen of an individual page.

In a case where the command for designating the individual page is input, the individual page is displayed as the display individual page on the image display unit by the page editing unit 36 according to a command of the user, as shown in FIG. 7.

FIG. 7 is an example of an editing screen of the individual page.

For example, the individual page which is a two-page spread page of the photo album is displayed in a region from an upper left portion of the editing screen to a central portion thereof. Edit buttons such as "replace" of the images and "remove" of the image are displayed at an upper portion of the individual page, and buttons for displaying the next and previous individual pages are displayed on a right side and a left side of the individual page. An image of the name (AAA) of the specific individual corresponding to this individual page and a character string indicating a comment (XXXX) is laid out at an upper left portion within the individual page by the layout unit 34.

The list of the names of the preschoolers, that is, AAA, BBB, CCC, . . . are displayed in a region from an upper right portion of the editing screen to a right center portion.

Editing candidate images for editing the individual page are displayed in a region from a lower left portion of the editing screen to a lower right portion.

Subsequently, the user inputs a command for editing the display individual page such as replacement, deletion, enlargement and reduction, and trimming of the image.

In a case where the command for editing the display individual page is input, the layout of the display individual page is edited by the page editing unit 36 according to a command of the user (step S12).

Similarly, in a case where the common page is edited, the user inputs a command for designating the common page to be edited.

In a case where the command for designating the common page is input, the common page is displayed as the display common page on the image display unit by the page editing unit 36 according to a command of the user.

Subsequently, the user inputs a command for editing the display common page.

In a case where the command for editing the display common page is input, the layout of the display common page is edited by the page editing unit 36 according to a command of the user (step S12). In a case where the editing of the layout according to the command of the user is ended, the processing is ended.

The photo album is basically edited by the teacher of the kindergarten and the preschool, but only the individual page may be edited by, for example, the parents of each preschooler in addition to the teacher. For example, the parents may access to and log on the image processing device 10 by using an application of a smartphone for using the image processing device 10, and then may edit only the individual page of their child.

In a case where the user finishes the editing of each page of the photo album, the user can order the prints of the photo albums of the plurality of persons. After the creation of the photo albums of all the persons is finished, the user may order the prints of the photo albums of all the persons at once, or may individually order the print of the photo album of each person whenever the creation of the photo album of each person is ended.

In the image processing device 10, since it is possible to create the photo album including the individual pages, it is possible to create the photo album customized according to the specific individual of the plurality of persons, that is, each person. Since it is possible to equalize the number of appearances of each person on the common images included in the common page, it is possible to remove a feeling of unfairness among the plurality of persons.

In a case where the individual page is designated, as shown in FIG. 7, for example, the individual designation unit 26 can designate, as the name of the specific individual, the name of one person selected according to a command of the user from the list of the names of the plurality of persons displayed on the image display unit.

In this case, the individual page of the person corresponding to the name of one person designated by the individual designation unit 26 is displayed as the display individual page on the image display unit by the page editing unit 36.

Accordingly, the user can display an individual page of a desired person on the image display unit by selecting a name of the desired person from the list of the names of the plurality of persons, and can view the displayed individual page.

The page editing unit 36 may select the images in which the person corresponding to the name of one person designated by the individual designation unit 26 appears among the plurality of images, and may preferentially display, as the editing candidate images for editing the display individual page on the image display unit, as shown in FIG. 7.

Accordingly, in a case where the display individual page is edited, the user can easily select the images in which the person corresponding to the display individual page appears from the plurality of images, and can use the selected image.

In a case where the individual images are displayed on the display individual page, for example, the image analysis unit 18 may detect the faces of the persons appearing in the individual images laid out on the display individual page, and the page editing unit 36 may distinguishably display a face frame surrounding a face region of the person for each person based on the detection results of the faces on the individual images laid out on the display individual page, as shown in FIG. 7. For example, a color, a thickness, and a line type of the face frame may be changed for each person.

Accordingly, the user can easily distinguish between the person corresponding to the display individual page and another person on the individual image.

TABLE 2

| Name | Entire | Display common page |
|---|---|---|
| AAA | 10 | 1 |
| BBB | 7 | 2 |
| CCC | 8 | 0 |
| . . . | . . . | . . . |

TABLE 3

| Name | Entire | 1-2P | 3-4P | 5-6P | ... |
|---|---|---|---|---|---|
| AAA | 15 | 1 | 2 | 1 | ... |
| BBB | 7 | 2 | 0 | 0 | ... |
| CCC | 2 | 0 | 1 | 0 | ... |
| ... | ... | ... | ... | ... | ... |

In a case where the display common page is displayed, the page editing unit 36 may display the numbers of appearances of the persons, that is, AAA, BBB, CCC, ... on the entire photo album and the display common page on the image display unit, as represented in Table 2.

Alternatively, as represented in Table 3, the numbers of appearances of the persons, that is, AAA, BBB, CCC, ... on the entire photo album and each of one or more common pages, for example, 1-2 pages (P), 3-4 P, 5-6 P, ..., may be displayed on the image display unit.

Accordingly, the user can easily ascertain the number of appearances of each person on the common images of the entire photo album and each common page, and can simply check whether or not there is an imbalance between the numbers of appearances of the persons for each page such as a case where the person appears only on the specific page even though the number of appearances is large.

Figure 8:
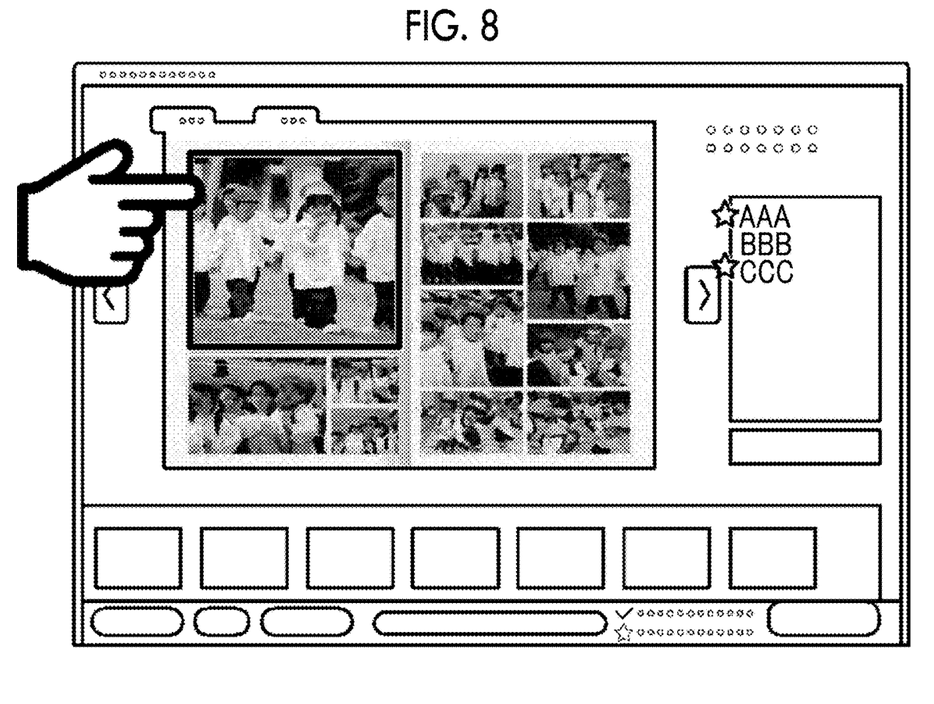
FIG. 8 is a conceptual diagram showing a state in which the name of the person corresponding to the person appearing in the image is identifiably displayed in the list of the names of the plurality of persons.

As shown in FIG. 8, the page editing unit 36 may display the list of the names of the plurality of persons on the image display unit, and may identifiably display the name of the person corresponding to the person appearing in the individual image or the common image (indicated by a finger mark in FIG. 8) selected according to a command of the user in the list. For example, in the list of the name of the person, the name of the person is identifiably displayed by giving a mark such as a star to a first part of the name of the person corresponding to each person or changing a color of the name of each person.

Alternatively, the page editing unit 36 may display the list of the names of the persons appearing in the individual image or the common image selected according to a command of the user on the image display unit.

Accordingly, the user easily knows the names of the person appearing in the individual image and the common image.

In a case where the display common page is edited, the image evaluation unit 20 may evaluate the images and may calculate the scores based on the analysis result of the plurality of images. In a case where the number of appearances of the specific person on the common images is greater than the average of the numbers of appearances of the plurality of persons, the page editing unit 36 may select the common images of which the scores are less than a threshold value from the common images in which the specific person appears, may display, as the deletion candidate images, the selected common images on the image display unit, and may delete the deletion candidate image selected according to a command of the user from the deletion candidate images displayed on the image display unit from the display common page.

Accordingly, the user can know the common images of which the scores are less than the threshold value among the common images in which the specific person appears, and can delete the common images in order from the image having, for example, the lowest score. The threshold value may be automatically set, or may be set by the user.

In a case where the number of appearances of the specific person on the common images is greater than the average of the numbers of appearances of the plurality of persons and the number of appearances of another person appearing on one common image which is smaller than the average of the numbers of appearances of the plurality of persons is further decreased by deleting one common image from the common images in which the specific person appears, the page editing unit 36 may select, as the deletion candidate images, the common images in which another person does not appear from the common images in which the specific person appears and display the selected common image on the image display unit, and may delete the deletion candidate image selected according to a command of the user from the deletion candidate images displayed on the image display unit from the display common page.

Accordingly, the user can know the deletion candidate images in the same manner, and it is possible to prevent the number of appearances of the person having the small number of appearances on the common images from being further decreased.

An alarm for confirming whether or not to delete the deletion candidate images may be generated by the alarm generation unit 38 before the deletion candidate images are deleted by the page editing unit 36. The alarm may be sound, or may be an alarm message.

In a case where the display common page is edited and the number of appearances of the specific person on the common images is less than the average of the numbers of appearances of the plurality of persons, the page editing unit 36 may select the common images of which the scores calculated by evaluating the images based on the analysis results of the plurality of images by the image evaluation unit 20 are equal to or greater than the threshold value from the common images in which the specific person appears, may display, as adoption candidate images, the selected common images on the image display unit, and may lay an adoption candidate image selected according to a command of the user from the adoption candidate images displayed on the image display unit out on the display common page.

Accordingly, the user can know the common images of which the scores are equal to or greater than the threshold value among the common images in which the specific person appears, and can lay out the common images in order from the common image having the highest score. Similarly, the threshold value may be automatically set, or may be set by the user.

In a case where the number of appearances of the specific person on the common images is less than the average of the numbers of appearances of the plurality of persons and the number of appearances of another person appearing in one common image which is larger than the average of the numbers of appearances of the plurality of persons is further increased by adding one common image among the common images in which the specific person appears, the page editing unit 36 may select the common images in which a person other than another person appears from the common images in which the specific person appears, may display, as the adoption candidate images, the selected common images on the image display unit, and may lay the adoption candidate image selected according to a command of the user from the adoption candidate images displayed on the image display unit out on the display common page.

Accordingly, the user can know the adoption candidate images in the same manner, and it is possible to prevent the number of appearances of the person having the large number of appearances on the common image from being further increased.

Figure 9:
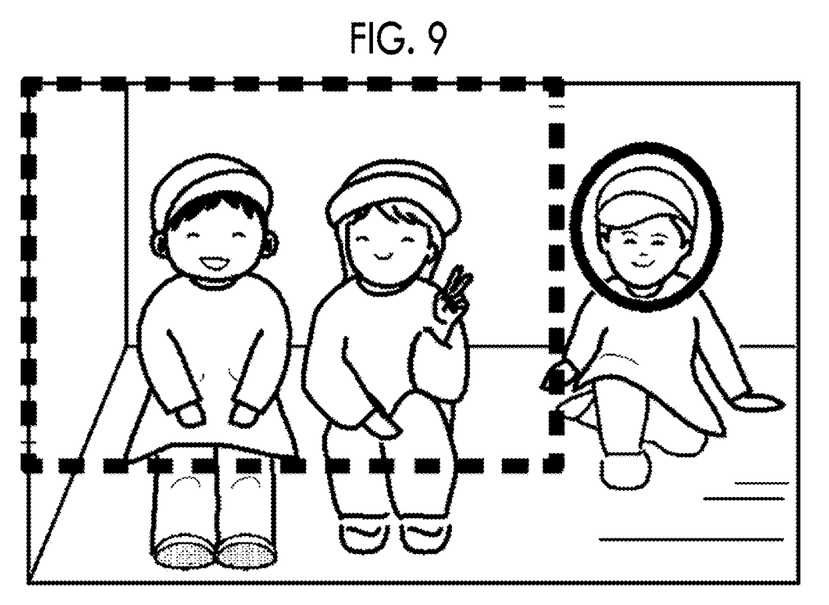
FIG. 9 is a conceptual diagram showing a state in which a specific person is deleted from the common image in which the specific person appears through trimming.

As shown in FIG. 9, in a case where the number of appearances of the specific person on the common image is greater than the average of the number of appearances of the plurality of persons, the page editing unit 36 may delete the specific person from the common image in which the specific person appears by trimming the common image in which the specific person appears.

In FIG. 9, an image in which one person surrounded by a circle, that is, the specific person is deleted through the trimming, and two persons surrounded by a broken-line square appear is illustrated.

Accordingly, it is possible to easily reduce the number of appearances of the specific person having the large number of appearances on the common images.

TABLE 4

| Name | Entire Main | Entire Sub | Display common page Main | Display common page Sub |
|---|---|---|---|---|
| AAA | 19 | 5 | 1 | 0 |
| BBB | 3 | 7 | 1 | 1 |
| CCC | 3 | 4 | 0 | 0 |
| ... | ... | ... | ... | ... |

In a case where the display common page is edited and the number of appearances of the specific person on the common image is counted, the image analysis unit 18 may detect the sizes of the faces of the persons appearing in the common image, and the appearance number count unit 32 may count, as a main appearance number, the number of appearances of each person of which the size of the face is equal to or greater than a threshold value on the common images, as represented in Table 4. The appearance number count unit may count, as a sub appearance number, the number of appearances of each person of which the size of the face on the common image is less than the threshold value, and may count the main and sub appearance numbers for the entire photo album.

In this case, the page editing unit 36 can use the main appearance number of the specific person instead of the number of appearances of the specific person, and can use the average of the main appearance numbers of the plurality of persons instead of the average of the number of appearances of the plurality of persons.

Even though the number of appearances is large, in a case where the size of the face of the child appearing in the common image is small, the parents of the child feel dissatisfied. The main appearance number is used, and thus, it is possible to equalize the numbers of appearances on the common images in which the person of which the size of the face is equal to or greater than the threshold value appears.

The threshold value may be automatically set, or may be set by the user. In a case where the threshold value is automatically set, the threshold value of the size of the face may be determined by a ratio of the size of the face to the size of the page of the photo album or a ratio of the size of the face to the size of the common image laid out on the display common page.

In a case where the display individual page is edited, the intimacy calculation unit 28 may calculate the degree of intimacy between the specific individual and each person other than the specific individual based on the analysis result of the plurality of images, and the page editing unit 36 may select the image for editing the display individual page from the plurality of images, may display, as the editing candidate image, the selected image on the image display unit, and may preferentially display the editing candidate image in which the person of which the degree of intimacy with the specific individual is equal to or greater than the threshold value appears on the editing candidate image.

Accordingly, the user can easily use, as the editing candidate image, the image in which another person of which the degree of intimacy with the specific individual is high appears.

In a case where the display individual page is edited, a list of the names of the persons of which the degree of intimacy with the specific individual is equal to or greater than the threshold value may be displayed on the image display unit.

Accordingly, the user selects a desired person from the list of the names of the persons of which the degree of intimacy with the specific individual is equal to or greater than the threshold value, and thus, to the user can display, as the editing candidate image, the image in which a person who is close to the specific individual appears on the image display unit.

Even though the individual image is selected, the intimacy calculation unit 28 may calculate the degree of intimacy between the specific individual and each person other than the specific individual based on the analysis result of the plurality of images, and the image selection unit 30 may preferentially select, as the individual image, the image in which the person of which the degree of intimacy with the specific individual is equal to or greater than the threshold value appears from the plurality of images.

Accordingly, in a case where the layout unit 34 automatically lays out the individual page, it is possible to preferentially use, as the individual image, the image in which another person of which the degree of intimacy with the specific individual is high appears.

The order quantity information storage unit 40 stores the information of the order quantity of the images ordered to be printed. Thus, in a case where the display common page is edited, the page editing unit 36 can select the image for editing the display common page from the plurality of images on the image display unit, can display, as the editing candidate image, the selected image, and can identifiably display the editing candidate image of which the order quantity of the images ordered to be printed in the past is equal to or greater than a threshold value among the editing candidate images displayed on the image display unit, as shown in FIG. 8. For example, it is possible to identifiably display the editing candidate image by giving a mark such as a star to the editing candidate image.

The images of which the order quantity is large are regarded as important images in common for the preschoolers and the parents thereof. Accordingly, the editing candidate images of which the past order quantity is equal to or greater than the threshold value are identifiably displayed, and thus, it is possible to edit the display common page by using the important images in common for the preschoolers and the parents thereof. The threshold value may be automatically set, or may be set by the user.

Similarly, the order quantity information storage unit 40 stores the information of the order quantity of the images ordered to be printed. Thus, in a case where the common images are selected, the image selection unit 30 can preferentially select, as the common images, the images of which the order quantity of the images ordered to be printed in the past is equal to or greater than the threshold value from the plurality of images.

Accordingly, in a case where the layout unit 34 automatically lays out the common page, it is possible to preferentially use, as the common images, the important images in common for the preschoolers and the parents thereof.

Figure 10:
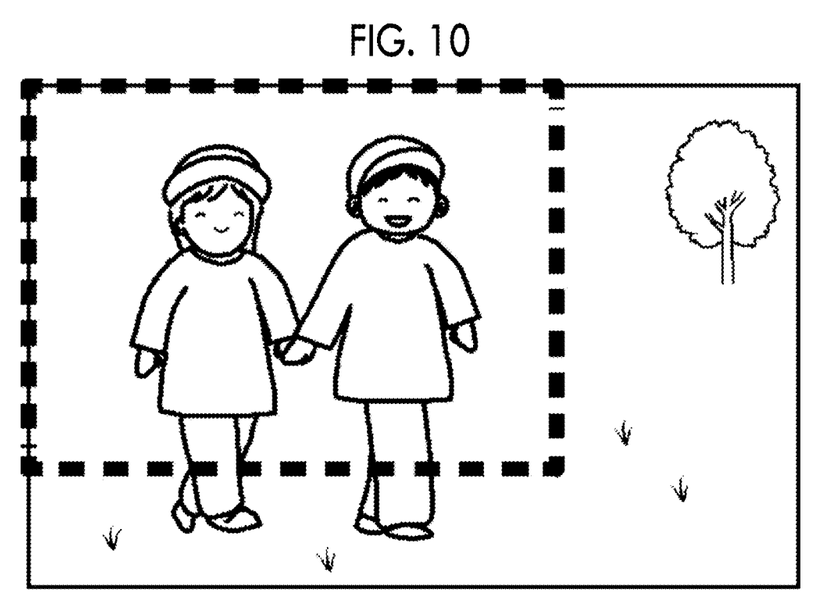
FIG. 10 is a conceptual diagram showing images ordered to be printed after the trimming is performed in the past.

As shown in FIG. 10, the trimming information storage unit 42 stores the trimming information of the images ordered to be printed after the trimming is performed. Thus, in a case where the display individual page is edited, the page editing unit 36 can perform the same trimming as that for the images ordered to be printed on the individual images based on the trimming information in a case where the individual images laid out on the display individual page are the images ordered to be printed after the trimming is performed in the past.

In FIG. 10, the images in which two persons surrounded by a broken-line square appear are extracted through the trimming.

A person who orders the images to be printed after the trimming is regarded as preferring the images after the trimming to the images before the trimming. Accordingly, the same trimming as that for the images ordered to be printed is performed on the individual images, and thus, it is possible to render the individual pages into preferable pages for this person.

The layout unit 34 may lay the common images out such that the number of persons appearing in the common images laid out in a region having a large size is greater than that in the common images laid out in a region having a small size on the common page.

The image selection unit 30 selects, as the common images, the images in which three or more persons of the plurality of images appear. However, in a case where many persons appear in the image, since the size of the face of each person becomes small, it is desirable that the number of persons appearing in the image is adjusted according to the size of the image in a case where the image is disposed on the common page. The size of the face of the person appearing in the common image in a case where the same common images are laid out in the region having the large size is greater than that in a case where the same common images are laid out in the region having the small size. Accordingly, the common images are laid out as stated above, and thus, it is possible to render the size of the face of the person appearing in the common image into a more preferable size.

The present invention is not limited to the kindergarten and the preschool, and may be similarly used in a case where various photo albums are created by using the plurality of images in which the plurality of persons appear in the group consisting of the plurality of persons such as a plurality of students at school and a plurality of colleagues at the company.

In the device of the present invention, a hardware configuration of processing units that perform various processing of the command obtaining unit 12, the name registration unit 14, the image obtaining unit 16, the image analysis unit 18, the image evaluation unit 20, the image classification unit 22, the association unit 24, the individual designation unit 26, the intimacy calculation unit 28, the image selection unit 30, the appearance number count unit 32, the layout unit 34, the page editing unit 36, the alarm generation unit 38, the order quantity information storage unit 40, and the trimming information storage unit 42 may be dedicated hardware, or may be various processors or computers that execute programs.

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of the various processors is an electric circuitry obtained by combining circuit elements such as semiconductor elements.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: image processing device
12: command obtaining unit
14: name registration unit
16: image obtaining unit
18: image analysis unit
20: image evaluation unit
22: image classification unit
24: association unit
26: individual designation unit
28: intimacy calculation unit
30: image selection unit
32: appearance number count unit
34: layout unit
36: page editing unit
38: alarm generation unit
40: order quantity information storage unit
42: trimming information storage unit

What is claimed is:
1. An image processing device comprising:
a processor configured to
obtain a command of a user,
register a plurality of persons,
obtain a plurality of images in which the plurality of persons appears,
analyze the plurality of images, associate each of the plurality of persons with the images in which each of the plurality of persons appears based on an analysis result of the plurality of images, designate a specific person among of the plurality of persons according to a command of the user, select individual images used on one or more individual pages included in a photo album and common images used on one or more common pages included in the photo album from the plurality of images based on the specific person, count number of appearances of each of the plurality of persons on the common images, lay the individual images out on the individual page and lay the common images out on the common page based on layout information, and preferentially select, as the individual images, images in which two or less persons including the specific person appear, and select, as the common images, images which are other than the individual images and in which three or more persons appear such that the number of appearances of each of the plurality of persons becomes an average of numbers of appearances of the plurality of persons.

2. The image processing device according to claim 1, wherein the processor is further configured to display, as a display individual page, the individual page which is laid out, on a display, to edit a layout of the display individual page according to a command of the user, and display, as a display common page, the common page which is laid out, on the display, to edit a layout of the display common page according to a command of the user.

3. The image processing device according to claim 1, wherein the processor is further configured to display a list of the plurality of persons on the display, and designate, as the specific person, one person selected according to a command of the user from the list of the plurality of persons.

4. The image processing device according to claim 2, wherein the processor is further configured to select images in which the specific person appears from the plurality of images, and preferentially display, as editing candidate images for editing the display individual page, the selected images on the display.

5. The image processing device according to claim 1, wherein the processor is further configured to display the numbers of appearances of each of the plurality of persons on at least one of the entire photo album or each of the one or more common pages on the display.

6. The image processing device according to claim 2, wherein the processor is further configured to display a list of the plurality of persons on the display, and identifiably display persons appearing in the individual image or the common image selected according to a command of the user in the list.

7. The image processing device according to claim 1, wherein the processor is further configured to display a list of persons appearing in the individual image or the common image selected according to a command of the user on the display.

8. The image processing device according to claim 2, wherein the processor is further configured to calculate a score by evaluating each image based on the analysis result of the plurality of images, and in a case where a number of appearances of the specific person in the common image is larger than the average of the numbers of appearances of the plurality of persons, select the common images of which the scores are smaller than a threshold value from the common images in which the specific person appears, display the selected common images as deletion candidate images on the display, and delete the deletion candidate image selected according to a command of the user from the deletion candidate images displayed on the display from the display common page.

9. The image processing device according to claim 2, wherein, in a case where a number of appearances of the specific person in the common image is larger than the average of the numbers of appearances of the plurality of persons, and number of appearances of another person becomes smaller than the average of the numbers of appearances of the plurality of person by deleting one common image from the common images in which the specific person appears, the processor is further configured to select the common images in which another person does not appear from the common images in which the specific person appears, display the selected common images as deletion candidate images on the display, and delete a deletion candidate image selected according to a command of the user from the deletion candidate images displayed on the display from the display common page.

10. The image processing device according to claim 2, wherein the processor is further configured to calculate a score by evaluating each image based on the analysis result of the plurality of images, and in a case where a number of appearances of the specific person in the common image is smaller than the average of the numbers of appearances of the plurality of persons, select the common images of which the scores are equal to or greater than a threshold value from the common images in which the specific person appears, display the selected common images as adoption candidate images on the display, and lay an adoption candidate image selected according to a command of the user from the adoption candidate images displayed on the display out on the display common page.

11. The image processing device according to claim 2, wherein, in a case where a number of appearances of the specific person in the common image is smaller than the average of the numbers of appearances of the plurality of persons, and number of appearances of another person becomes larger than the average of the numbers of appearances of the plurality of persons by adding one common image from the common images in which the specific person appears, the processor is further configured to select the common images in which a person other than another person appears from the common images in which the specific person appears, display the selected common images as adoption candidate images on the display, and lay an adoption candidate image selected according to a command of the user from the adoption candidate images displayed on the display out on the display common page.

12. The image processing device according to claim 1, wherein, in a case where a number of appearances of the specific person in the common image is larger than the average of the numbers of appearances of the plurality of persons, the processor is further configured to delete the specific person from the common images in which the specific person appears by trimming the common images in which the specific person appears.

13. The image processing device according to claim 1, wherein the processor is further configured to
detect a size of a face of a person appearing in the common image,
count, as a main appearance number, the number of appearances of each of the plurality of persons of which the size of the face is equal to or greater than a threshold value on the common image, and
use the main appearance number of the specific person instead of a number of appearances of the specific person, and use an average of the main appearance numbers of the plurality of persons instead of the average of the numbers of appearances of the plurality of persons.

14. The image processing device according to claim 2, wherein the processor is further configured to
calculate degrees of intimacy of the specific person and each person other than the specific person based on the analysis result of the plurality of images,
select images for editing the display individual page from the plurality of images, display the selected images as editing candidate images on the display, and preferentially display the editing candidate image in which a person of which the degree of intimacy with the specific person is equal to or greater than a threshold value appears among the editing candidate images.

15. The image processing device according to claim 1, wherein the processor is further configured to
calculate degrees of intimacy of the specific person and each person other than the specific person based on the analysis result of the plurality of images,
preferentially select, as the individual images, images in which a person of which the degree of intimacy with the specific person is equal to or greater than a threshold value appears from the plurality of images.

16. The image processing device according to claim 1, wherein the processor is further configured to
store trimming information of an image ordered to be printed after trimming is performed among the plurality of images, and
in a case where the individual image laid out on a display individual page is an image ordered to be printed after the trimming is performed in the past, perform the same trimming as the trimming of the image ordered to be printed on the individual image based on the trimming information.

17. The image processing device according to claim 2, wherein the processor is further configured to
store information on an order quantity of an image ordered to be printed among the plurality of images, and
select images for editing the display common page from the plurality of images, display the selected images as editing candidate images on the display, and identifiably display the editing candidate image of which the order quantity of the image ordered to be printed in the past is equal to or greater than a threshold value among the editing candidate images displayed on the display.

18. The image processing device according to claim 1, wherein the processor is further configured to
store information on an order quantity of an image ordered to be printed among the plurality of images, and
preferentially select, as the common images, images of which the order quantity of the image ordered to be printed in the past is equal to or greater than a threshold value from the plurality of images.

19. The image processing device according to claim 1, wherein the processor is further configured to lay the common images out on the common page such that a number of persons appearing in the common image laid out in a region having a large size is larger than a number of persons appearing in the common image laid out in a region having a small size.

20. An image processing method comprising:
a step of obtaining a command of a user;
a step of registering a plurality of persons;
a step of obtaining a plurality of images in which the plurality of persons appears;
a step of analyzing the plurality of images;
a step of associating each of the plurality of persons with the images in which each of the plurality of persons appears based on an analysis result of the plurality of images;
a step of designating a specific person among the plurality of persons according to a command of the user;
a step of selecting individual images used on one or more individual pages included in a photo album and common images used on one or more common pages included in the photo album from the plurality of images based on the specific person;
a step of counting number of appearances of each plurality of persons on the common images; and
a step of laying the individual images out on the individual page and laying the common images out on the common page based on layout information,
wherein, in the step of selecting the individual images and the common images, images in which two or less persons including the specific person appear are preferentially selected as the individual images, and images which are other than the individual images and in which three or more persons appear are selected as the common images such that the number of appearances of each of the plurality of persons becomes an average of numbers of appearances of the plurality of persons.

21. A non-transitory computer-readable recording medium having recorded thereon a program causing a computer to execute the steps of the image processing method according to claim 20.

* * * * *